July 6, 1948.  M. C. JONES ET AL  2,444,651
SHAPING CIRCUIT FOR CATHODE BEAM TUBES
Filed Nov. 30, 1944
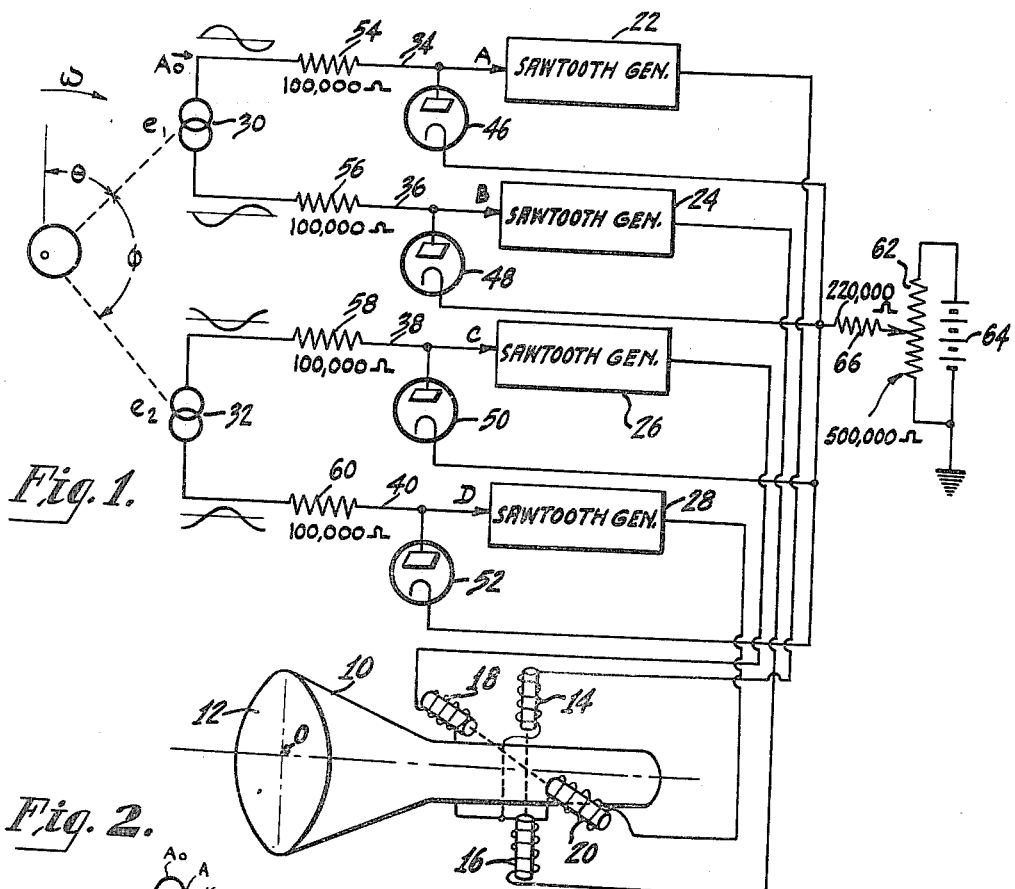
Fig. 1.
Fig. 2.
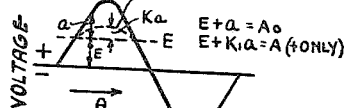
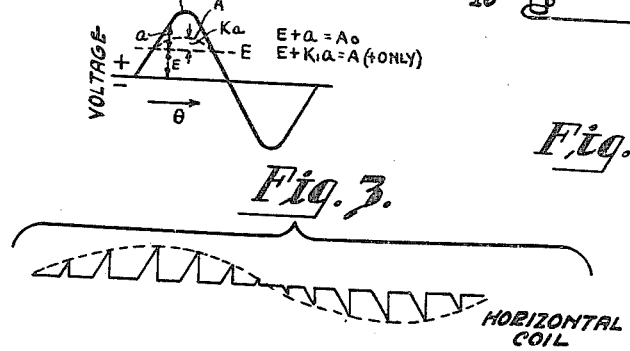
Fig. 3.
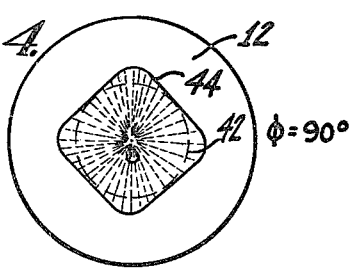
Fig. 4.
INVENTORS
MACK C. JONES
& LESLIE E. MATSON JR.
BY
ATTORNEY Patented July 6, 1948

2,444,651

UNITED STATES PATENT OFFICE 2,444,651

SHAPING CIRCUIT FOR CATHODE BEAM TUBES

Mack C. Jones, Haddon Heights, and Leslie E. Matson, Jr., Collingswood, N. J., assignors to Radio Corporation of America, a corporation of Delaware Application November 30, 1944, Serial No. 565,860

7 Claims. (Cl. 315—24)

This invention relates to cathode beam tubes of the type in which a rotating, radial sweep deflection of the electron beam occurs. More specifically, the invention relates to a method of and means for securing a pattern of desired shape on the indicator screen of the tube.

Cathode beam tubes with rotating, radial sweep deflection systems are described in de Forest Patent No. 2,241,809 and in Poch Patent No. 2,313,-966. It is frequently important that the pattern on the indicator screen of tubes of this type shall assume some particular shape. Thus, if the rotating, radial sweep on the fluorescent screen of a cathode ray tube is properly calibrated and the pattern is circular, a pulse reflected from a distant object and applied to the control electrode of the tube will provide a visual indication of the distance and bearing of that object. Owing, however, to non-linearity in the tubes and other components of the deflecting circuits it is not always possible to obtain a pattern which is perfectly circular or of other desired shape.

It is, therefore, an object of the invention to provide an improved rotating, radial deflection system for a cathode beam tube.

Another object is to provide a screen pattern shaping circuit for a cathode ray tube.

A further object is to provide an improved method of and means for procuring a pattern of desired shape, and particularly a circular pattern, on the indicator screen of a cathode beam tube.

Another and particular object of the invention is to provide means for compensating for pattern distortion caused by non-linearity in the tubes and other components of the deflection circuits for cathode beam tubes.

A further object is to provide a method of and means for modifying the boundary of the area scanned by the beam of a cathode ray tube which is provided with a rotating, radial beam deflection system.

In one form of rotating, radial deflection system the rotation of the plane or direction of deflection is effected by modulating the amplitude of the beam-deflecting signals in a manner hereinafter described. The objects of the present invention are achieved by distorting or varying the extent of this modulation to obtain the desired pattern. In a preferred embodiment, the distorting means may consist of a diode inserted between each source of modulating voltage and each deflection signal source. The diode with its associated circuits acts in this case as a non-linear resistor, conducting only on part of the cycle of applied modulating voltage, and effects a flattening or other distorting of the wave of the modulating voltage. An adjustable source of biasing potential for the diode acts as a ready means of adjusting the degree of distortion. This source of biasing potential may be common to all the deflection signal channels.

In the accompanying drawing,

Figure 1 is a block diagram, partly schematic, of the deflection circuits of a cathode beam tube, including the shaping circuit and controls of the invention, Figure 2 is a diagram of a modulating voltage wave generated in the circuit of Fig. 1 and illustrates the effect on the shape of the modulating voltage wave of the shaping circuit of the invention, Figure 3 illustrates the manner in which the amplitude of the deflection signals is modulated, and Figure 4 is a front view of a screen of a cathode beam tube showing how a particular pattern may be obtained according to the invention.

Referring to Fig. 1, a cathode beam tube 10, having a fluorescent indicator screen 12, preferably of the long-persistence type, is provided with a pair of diametrically opposed, deflecting coils 18 and 20. The pairs of coils are so arranged that the lines of force of the respective magnetic fields which they produce are perpendicular to each other.

Current for the coils 14 and 16 is provided by a pair of saw-tooth current generators 22 and 24, respectively, (which may include appropriate amplifiers). The current through the coils establishes a magnetic field which deflects the electron beam horizontally through a point 0. Thus, the beam traces a horizontal line on the screen. Similarly, current for the coils 18 and 20 is provided by a second pair of saw-tooth generators 26 and 28, respectively. The current through the coils establishes a magnetic field which deflects the beam vertically. The direction in which the beam is deflected, either vertically or horizontally, is determined by the direction of current flow in the respective coils producing the deflection. When current flows in both pairs of coils, there will be a resultant magnetic field and, therefore, a radial deflection of the beam through the point 0 (which will be on the longitudinal axis of the tube if the beam is properly centered); the magnitude and direction of this resultant deflection is determined by the relative intensity and phase of the deflecting saw-tooth currents.

Rotation of the plane of resultant deflection is caused by modulating the amplitude of the beam-deflecting signals by a four-phase sine voltage, for example, in the manner described in the before-mentioned Poch patent.

In the circuit of Fig. 1, the modulating voltages are derived from sine wave generators 30 and 32, the sine wave voltage source 30 being connected by conductors 34 and 36 to the saw-tooth generators 22 and 24, respectively, while the sine wave voltage source 32 is connected by conductors 38 and 40 to saw-tooth generators 26 and 28, respectively. The modulating voltage applied to saw-tooth generator 22 is 180° out of phase with that applied to generator 24, and the same is true of the modulating voltages applied to generator 26 and 28. The two sine wave generators are so arranged that their respective outputs are 90° out of phase. Thus arranged, quadrature phase currents are applied to the saw-tooth generators. A common source of sine wave voltage may be substituted for these two generators by utilizing networks containing appropriate phase shifting arrangements which are well known to those skilled in the art. In either case, the voltages applied to the four saw-tooth generators are in quadrature.

In one actual apparatus the frequency of the sinusoidal modulation is low—one complete cycle every twelve seconds—by comparison with a repetition rate of 60 cycles per second of the saw-tooth currents. The duration of each radial sweep is extremely short, and lasts for only 250 to 2500 microseconds, depending on the range desired, out of the total period of 1/60 second between the commencement of successive saw-tooth pulses. The combination of the saw-tooth deflecting signals with the sinusoidal voltage provides a modulated deflecting signal, the shape of which is illustrated, though not in proportion, by Fig. 3.

The combined effect of this arrangement is to cause the electron beam to traverse a succession of radial paths, all passing through the center 0 and each displaced from the next by an angle determined by the frequency of the sinusoidal modulating voltage. The radial paths are shown by dotted lines in Fig. 4, where the angular displacement between successive radial paths has been exaggerated for purposes of illustration.

When the beam reaches the limit of its radial excursion it may leave a luminescent spot on the indicator screen, and in that event the combined effect of the rotating, radial sweep is, therefore, to produce a pattern which appears to be a continuous, luminescent line on the indicator screen of the tube. In some applications of apparatus of this type the limit of beam-deflection does not become visible; but the invention is equally concerned with the area on the indicator screen scanned by the beam in its successive radial excursions, whether visible or not.

The sinusoidal voltages may be synchronized with any desired function; e. g., with the rotation of a directive antenna. If, for example, only a sector of the area surrounding a directive pulse-transmitting antenna is to be scanned, the antenna may be caused to reciprocate between the radial bounds of that sector; the modulating voltages will then vary in accordance with this reciprocal movement, and may not reach a negative value as indicated in the drawings.

Since the voltages produced by the sine wave generators 30 and 32 are 90° out of phase with each other, the pattern produced on the indicator screen 12 should in theory be circular, as shown by the broken line 42 in Fig. 4. Owing, however, to nonlinearity in the sweep generating tubes, amplifiers and other components of the associated circuits of the cathode beam tube, the pattern may assume the square shape shown by the solid line 44 of Fig. 4.

To correct this distortion, diodes 46, 48, 50 and 52 are connected, one from each of the conductors 34, 36, 38 and 40 to ground with resistors 54, 56, 58 and 60, respectively, connected between the anode of each diode and each source of modulating voltage. By way of example, in one actual apparatus, in which the sine wave generators 30 and 32 have a peak amplitude of 150 volts, these resistors each had a value of 100,000 ohms. Biasing potential from a source thereof, indicated at 64, is applied to the cathode of each of the diodes. The biasing potential is adjusted by a potentiometer 62 which is connected across the source 64. The potentiometer may have a value of 500,000 ohms. It will be apparent that although a common source of bias for all four tubes is shown, individual biasing potentials may be applied to each of the tubes.

The diode 46 conducts on that part of the positive half cycle of voltage produced by generator 30, which is sufficient to overcome its cathode bias. In a similar manner, the diode 48 conducts when its bias is overcome by the positive peak of the applied potential. The setting of the potentiometer 62, which in turn controls the bias on the cathode of each tube, determines on which portion of their characteristic curve the diodes will operate. The diode 46, therefore, effects a flattening of the positive half of the voltage derived from generator 30, as illustrated in Fig. 2, while diode 48 flattens the succeeding positive portion of the same voltage wave. The diodes 50 and 52 act similarly in relation to the output of sine wave generator 32. Each of the four diodes may be thought of as a non-linear resistance. While the potential E (Figs. 1 and 2), controlled by the setting of potentiometer 62, determines the point at which flattening of the sine voltage wave occurs, the amount of flattening is determined by the value of each of the resistors 54 to 60, having regard to the other circuit parameters of each diode; these resistors may be made variable if desired. A resistor 66 may be inserted in the common cathode bias circuit, to alter the effective resistance of the diodes and thus the point at which flattening commences.

The flattening of the sine voltage waves affects the degree of modulation applied to the saw-tooth deflecting currents, and hence the length of the radial path traversed by the beam; it thus alters the boundary of the area on the indicator screen scanned by the beam in its radial excursions, and therefore, of the pattern appearing on the screen. By adjustment of the potentiometer 62, the square pattern shown by the line 44 (Fig. 4) may be altered to a circle. It will be apparent that if a screen pattern of some other shape is desired, this may be achieved by so operating the diodes of 46 and 52 as to effect an appropriate distortion of the modulating voltage waves.

Numerous variations within the scope of the invention will suggest themselves to those skilled in the art. For example, any appropriate source of saw-tooth deflecting currents may be employed, and electrostatic deflection may be substituted for the electromagnetic deflection here described. For the purposes of the present invention, in place of the four deflecting coils 14-20 inclusive, there need be only means tending to deflect the beam in at least two radial directions which are angularly related but not necessarily perpendicular to each other.

In place of the two diodes 46 and 50 a double diode (for example, of the RCA type 6H6) may be substituted, and the same substitution may be made for the pair of diodes 48 and 52. These tubes may be thought of as effecting a gradual limitation of the modulating voltage wave, as shown in Fig. 2. Instead of applying a positive bias to the cathode of each diode, a negative bias may be applied to the anode. In that event, the sine wave generators 30 and 32 will be connected to the cathode instead of to the anode of each diode.

There has thus been described a screen pattern shaping circuit for a cathode beam tube of the type in which the beam is deflected radially and in which the deflection signals are modulated to effect a rotation of the radial plane of sweep. The shaping circuit provides means for distorting, limiting or otherwise varying the modulating signals and may consist of a diode in each beam deflection signal channel with an adjustable source of biasing potential.

We claim as our invention:

1. A cathode ray tube scanning system comprising in combination a cathode ray tube including means for generating an electronic beam and a fluorescent screen for indicating impinging electrons of said beam, means for deflecting said beam along angularly disposed, radial lines on said screen, a source of saw-tooth deflecting signals, means for applying said signals to said deflecting means for procuring a radial sweep of said beam, a source of quadrate phase, sine-wave potentials, means for applying said potentials to modulate said signals whereby to procure a rotation of the plane of said radial sweep, and diode means connected between said source of sine wave potentials and said source of deflecting signals for modifying said potentials whereby to modify the resultant boundary of the area scanned by said beam upon application of said modulated signals to said deflecting means.

2. A cathode ray tube scanning system comprising in combination a cathode ray tube including means for generating an electronic beam and a fluorescent screen for indicating impinging electrons of said beam, means for deflecting said beam along angularly disposed, radial lines on said screen, a source of saw-tooth deflecting signals, means for applying said signals to said deflecting means for procuring a radial sweep of said beam, a source of quadrate phase, sine-wave potentials, means for applying said potentials to modulate said signals whereby to procure a rotation of the plane of said radial sweep, and means for modifying said potentials whereby to modify the resultant boundary of the area scanned by said beam upon application of said modulated signals to said deflecting means, said last-mentioned means including a diode connected between said source of sine wave potentials and said source of deflecting signals, and an adjustable source of bias for said diode.

3. A cathode beam tube having two sets of beam-deflecting means and beam-deflection signal channels connected to said deflecting means respectively, means for applying to each of said channels a saw-tooth wave deflecting signal, said beam-deflection means being so located with respect to said tube and each other as to tend to deflect said beam in radial planes normal to each other and passing through the longitudinal axis of the tube whereby to secure a resultant deflection of said beam in a radial plane of sweep passing through said axis, means for applying to each of said channels sine wave signals from a source thereof to modulate said saw-tooth wave signals, said sine wave signals being in quadrature and so related to said saw-tooth wave signals as to secure a rotation of said plane of sweep whereby to cause said beam to traverse successive radial paths of different lengths, said distorting means including a diode connected between each of said sine wave signal sources and each of said beam-deflection signal channels, a resistor connected between each of said sources and the anode of each of said diodes, and a source of direct current bias potential of adjustable value for the cathode of each of said diodes.

4. A screen pattern shaping circuit for a cathode beam tube which is provided with means for deflecting the beam radially, a source of varying voltage and means controlled by said varying voltage for modulating said deflecting means, said circuit comprising a diode, a source of direct current bias potential for the cathode of said diode, a connection including a resistor from said source of varying voltage to the anode of said diode, and connections for applying the output of said diode to said deflecting means.

5. A cathode ray tube scanning system comprising in combination a cathode ray tube including means for generating an electronic beam, a fluorescent screen for indicating impinging electrons of said beam, means for deflecting said beam, a source of quadrate phase, sine-wave potentials, diode means connected so as to draw current which is a function of the instantaneous magnitude of said potentials whereby the magnitude of the output potential differs from the magnitude of the input potential, and means for applying said output to said deflecting means.

6. A cathode ray tube scanning system comprising in combination a cathode ray tube including means for generating an electronic beam and a fluorescent screen for indicating impinging electrons of said beam, means for deflecting said beam along angularly disposed, radial lines on said screen, a source of saw-tooth deflecting signals, means for applying said signals to said deflecting means for procuring a radial sweep of said beam, a source of quadrate phase, sine wave potentials, means for applying said potentials to moduate said signals whereby to procure a rotation of the plane of radial sweep and means comprising non-linear resistance means for modifying said potentials in a predetermined manner whereby said beam is caused to traverse successive radial paths of predetermined lengths upon application of said modulated signals to said deflecting means.

7. A cathode ray tube scanning system comprising in combination a cathode ray tube including means for generating an electronic beam and a fluorescent screen for indicating impinging electrons of said beam, means for deflecting said beam along angularly disposed radial lines on said screen, a source of saw-tooth deflecting signals, means for applying said signals to said deflecting means for procuring a radial sweep of said beam, a source of quadrate phase, sine wave potentials, means for applying said potentials to modulate said signals whereby to procure a rotation of the plane of radial sweep and means comprising non-linear resistance means connected between said source of sine wave potentials and said source of deflecting signals for modifying said potentials in a predetermined manner whereby said beam is caused to traverse succeessive radial paths of predetermined lengths upon application of said modulated signals to said deflecting means.

MACK C. JONES.
LESLIE E. MATSON, JR.

REFERENCES CITED

The following references are of record in the file of this patent:

UNITED STATES PATENTS

| Number | Name | Date |
|---|---|---|
| 2,100,279 | George et al. | Nov. 23, 1937 |
| 2,121,103 | Seeley | June 21, 1938 |
| 2,121,359 | Luck et al. | June 21, 1938 |
| 2,172,395 | McSpadden | Sept. 12, 1939 |
| 2,241,809 | DeForest | May 13, 1941 |
| 2,265,848 | Lewis | Dec. 9, 1941 |
| 2,312,761 | Hershberger | Mar. 2, 1943 |
| 2,313,966 | Poch | Mar. 16, 1943 |
| 2,347,008 | Vance | April 18, 1944 |
| 2,360,466 | Bedford et al. | Oct. 17, 1944 |

FOREIGN PATENTS

| Number | Country | Date |
|---|---|---|
| 541,569 | Great Britain | Dec. 2, 1941 |
| 542,634 | Great Britain | Jan. 21, 1942 |